United States Patent
O'Shaugnessy et al.

(10) Patent No.: US 9,619,784 B2
(45) Date of Patent: Apr. 11, 2017

(54) PRESENTING IMAGE PREVIEWS OF WEBPAGES

(75) Inventors: Timothy O'Shaugnessy, Washington, DC (US); Sudheer Agrawal, Ashburn, VA (US)

(73) Assignee: FACEBOOK, INC., Menlo Park, CA (US)

( * ) Notice: Subject to any disclaimer, the term of this patent is extended or adjusted under 35 U.S.C. 154(b) by 988 days.

(21) Appl. No.: 13/619,184

(22) Filed: Sep. 14, 2012

(65) Prior Publication Data

US 2013/0067354 A1    Mar. 14, 2013

Related U.S. Application Data

(63) Continuation of application No. 12/890,366, filed on Sep. 24, 2010, which is a continuation of application No. 11/618,656, filed on Dec. 29, 2006, now Pat. No. 7,814,425.

(60) Provisional application No. 60/754,673, filed on Dec. 30, 2005.

(51) Int. Cl.
*G06F 3/0481* (2013.01)
*G06Q 10/10* (2012.01)
*H04L 12/58* (2006.01)

(52) U.S. Cl.
CPC ....... *G06Q 10/107* (2013.01); *G06F 3/04817* (2013.01); *H04L 51/00* (2013.01); *H04L 51/04* (2013.01); *H04L 51/046* (2013.01)

(58) Field of Classification Search
CPC . H04L 12/581; G06Q 10/10; G06F 17/30716; G06F 17/30882
See application file for complete search history.

(56) References Cited

U.S. PATENT DOCUMENTS

| | | | |
|---|---|---|---|
| 6,041,143 A | 3/2000 | Chui et al. | |
| 6,182,133 B1 * | 1/2001 | Horvitz | G06F 17/30902 707/999.008 |
| 6,297,824 B1 | 10/2001 | Hearst et al. | |
| 6,496,206 B1 | 12/2002 | Mernyk et al. | |
| 6,544,295 B1 | 4/2003 | Bodnar | |
| 6,667,751 B1 | 12/2003 | Wynn et al. | |
| 6,801,227 B2 | 10/2004 | Bocionek et al. | |
| 6,876,977 B1 * | 4/2005 | Marks | G06Q 30/06 705/26.62 |
| 7,016,704 B2 | 3/2006 | Pallakoff | |
| 7,814,425 B1 | 10/2010 | O'Shaugnessy | |
| 8,103,546 B1 | 1/2012 | Des Jardins et al. | |

(Continued)

OTHER PUBLICATIONS

PCT International Search Report (International Application No. PCT/US07/02440) mailed Feb. 14, 2008 (3 pages).

(Continued)

*Primary Examiner* — Steven Sax
(74) *Attorney, Agent, or Firm* — Keller Jolley Preece

(57) ABSTRACT

An instant message is received from an instant message sender and a determination is made that the instant message includes a link to a web page that was selected by the instant message sender. In response to determining that the instant message includes the link to the web page, an image corresponding to the web page is fetched and stored, and a thumbnail image preview of the fetched image is generated. In addition, the thumbnail image preview of the fetched portion of the web page is displayed while at least a portion of the instant message is displayed.

20 Claims, 16 Drawing Sheets

(56) References Cited

U.S. PATENT DOCUMENTS

| | | | |
|---|---|---|---|
| 8,682,961 B2* | 3/2014 | Arav | G06Q 10/107 709/203 |
| 8,700,704 B2* | 4/2014 | Arav | G06Q 10/107 709/204 |
| 2001/0037359 A1 | 11/2001 | Mockett et al. | |
| 2001/0038395 A1 | 11/2001 | Holtzblatt et al. | |
| 2002/0093537 A1 | 7/2002 | Bocioned et al. | |
| 2002/0129114 A1 | 9/2002 | Sundaresan et al. | |
| 2002/0163545 A1 | 11/2002 | Hii | |
| 2002/0191031 A1 | 12/2002 | Ricard | |
| 2002/0196272 A1 | 12/2002 | Ramos et al. | |
| 2003/0182402 A1 | 9/2003 | Goodman et al. | |
| 2003/0202704 A1 | 10/2003 | Moghaddam et al. | |
| 2004/0003351 A1 | 1/2004 | Sommerer et al. | |
| 2004/0093562 A1 | 5/2004 | Diorio et al. | |
| 2004/0168132 A1 | 8/2004 | Travieso et al. | |
| 2004/0205514 A1 | 10/2004 | Sommerer et al. | |
| 2004/0215608 A1* | 10/2004 | Gourlay | G06F 17/30864 |
| 2005/0022128 A1 | 1/2005 | Nicholas et al. | |
| 2005/0108033 A1 | 5/2005 | Everett-Church | |
| 2006/0064411 A1 | 3/2006 | Gross et al. | |
| 2006/0095397 A1 | 5/2006 | Torres et al. | |
| 2006/0101514 A1 | 5/2006 | Milener et al. | |
| 2006/0185445 A1 | 8/2006 | Delcher et al. | |
| 2006/0230021 A1* | 10/2006 | Diab | G06F 17/30873 |
| 2006/0265417 A1 | 11/2006 | Amato et al. | |
| 2007/0033169 A1 | 2/2007 | Friedman | |
| 2007/0050252 A1 | 3/2007 | Jain | |
| 2007/0050253 A1 | 3/2007 | Biggs et al. | |
| 2007/0067733 A1* | 3/2007 | Moore | G06F 17/30899 715/777 |
| 2007/0074125 A1 | 3/2007 | Platt et al. | |
| 2007/0088680 A1 | 4/2007 | Sauve et al. | |
| 2007/0124670 A1 | 5/2007 | Finck et al. | |
| 2007/0143414 A1 | 6/2007 | Daigle | |
| 2008/0005247 A9 | 1/2008 | Khoo | |
| 2008/0046218 A1 | 2/2008 | Dontcheva et al. | |
| 2011/0113346 A1 | 5/2011 | O'Shaugnessy | |
| 2013/0311902 A1 | 1/2013 | O'Shaugnessy | |
| 2013/0318448 A1 | 11/2013 | O'Shaugnessy | |

OTHER PUBLICATIONS

PCT Written Opinion (International Application No. PCT/US07/02440) mailed Feb. 14, 2008 (5 pages).
U.S. Appl. No. 11/342,644, Mar. 13, 2008, Office Action.
U.S. Appl. No. 11/342,644, Sep. 11, 2008, Office Action.
U.S. Appl. No. 11/618,656, Dec. 9, 2008, Office Action.
U.S. Appl. No. 11/618,656, Jun. 1, 2009, Office Action.
U.S. Appl. No. 11/618,656, Jan. 11, 2010, Office Action.
U.S. Appl. No. 11/618,656, Jun. 11, 2010, Notice of Allowance.
U.S. Appl. No. 12/890,366, Dec. 17, 2014, Office Action.
U.S. Appl. No. 12/890,366, Jun. 13, 2014, Office Action.
U.S. Appl. No. 14/948,050, filed Nov. 20, 2015, O'Shaugnessy.
U.S. Appl. No. 12/890,366, Oct. 1, 2015, Office Action.
U.S. Appl. No. 13/946,199, Sep. 24, 2015, Office Action.
U.S. Appl. No. 12/890,366, Jun. 5, 2015, Office Action.
U.S. Appl. No. 12/890,366, Apr. 8, 2016, Office Action.
U.S. Appl. No. 13/946,476, Apr. 28, 2016, Office Action.

* cited by examiner

PRESENTING IMAGE PREVIEWS OF WEBPAGES

CROSS-REFERENCE TO RELATED APPLICATION

The present application is a continuation of U.S. application Ser. No. 12/890,366, filed Sep. 24, 2010, which is a continuation of Ser. No. 11/618,656, filed Dec. 29, 2006, which is now issued as U.S. Pat. No. 7,814,425, which claims the benefit of and priority to U.S. provisional application No. 60/754,673, filed Dec. 30, 2005. Each of the aforementioned patent(s) and application(s) are hereby incorporated by reference in their entirety.

TECHNICAL FIELD

This disclosure relates to thumbnail image previews.

BACKGROUND

The World Wide Web (web) is a system of interlinked resources, such as, for example, hypertext documents (web pages) that may include text, images, sounds, videos, and various other forms of multimedia, that are linked together over the Internet. Resources available on the web generally are identified by uniform resource locators (URLs) that specify the global network addresses of the resources. Resources available on the web may be accessed by instructing a web browser, or similar application, running on a client computer to retrieve resources at particular network addresses by specifying their corresponding URLs.

For example, a web page, or other resource, available on the web may be viewed by entering the URL of the web page, or other resource, in a navigation bar of a web browser, or similar application, running on a client computer. In response, the web browser requests the web page, or other resource, from the server that corresponds to the specified URL and the server transmits the web page to the client computer on which the web browser is running. The web browser then renders, or otherwise displays, the web page, or other resource, received from the server.

Many web pages include embedded hyperlinks (links) to other web pages and/or resources available on the web that enable a user to access the linked web pages and/or resources by selecting the links instead of affirmatively entering the URLs of the web pages and/or resources in the navigation bar of a web browser.

After accessing and displaying a web page, some web browsers may transparently prefetch one or more web pages and/or other resources linked by the displayed page and store the prefetched pages and/or resources in local cache. Then, if a user instructs the web browser to access one of the prefetched web pages or other resources linked to the displayed page, the web browser can quickly serve up the requested web page or resource from local cache rather than having to retrieve the web page or resource from the remote server on which it resides.

SUMMARY

In one aspect, an instant message is received from an instant message sender and a determination is made that the instant message includes a link to a web page that was selected by the instant message sender. In response to determining that the instant message includes the link to the web page, an image corresponding to the web page is fetched and stored, and a thumbnail image preview of the fetched image is generated. In addition, the thumbnail image preview of the fetched portion of the web page is displayed while at least a portion of the instant message is displayed.

Implementations may include one or more of the following features. For example, the fetched image may be a surrogate image that is representative of the web page. Alternatively, the fetched image may be at least a portion of the web page. In implementations where the fetched image is at least a portion of the web page, the thumbnail image preview may include one or more features having a scale that is reduced relative to one or more corresponding features of the fetched portion of the web page.

In some implementations, the portion of the instant message that is displayed may include the link to the web page. In such implementations, a determination may be made that a cursor associated with a pointing device is hovering over the displayed link to the web page, and the thumbnail image preview may be displayed in response.

In some implementations, display of the thumbnail image preview may be initiated substantially concurrently with initiating display of the portion of the instant message.

In another aspect, an instant message for an intended recipient is received from an instant message sender, and a determination is made that the instant message includes a link to a web page that was selected by the instant message sender. In response to determining that the instant message includes the link to the web page, an image corresponding to the web page is fetched and a thumbnail image preview of the fetched image is generated. In addition, the thumbnail image preview is included in the instant message, and the instant message, including the thumbnail image preview, is sent to the intended recipient.

Implementations of any of the techniques described may include a method or process, an apparatus or system, or computer software on a computer-accessible medium. The details of one or more implementations are set forth in the accompanying drawings and the description below.

DESCRIPTION OF DRAWINGS

Like reference symbols in the various drawings may indicate like elements.

DETAILED DESCRIPTION

A web browser prefetches at least one web page or other resource made accessible through a link on a web page currently in view. For example, if CNN.com is currently in view, the web browser prefetches at least one web page made accessible through a link on the CNN.com home page and stores the prefetched page(s) in local cache. Thereafter, the web browser generates a thumbnail image preview of the prefetched web page that may be used to provide a user with a preview of the content available on the web page made accessible through the link on the web page currently in view. For example, the thumbnail image preview may be used to supplement or replace a textual description associated with the link.

In one implementation, a thumbnail image preview of a prefetched web page may be displayed persistently. Additionally or alternatively, a thumbnail image preview may be displayed after a triggering event. For example, when a user "mouses over" a link on a web page currently in view, a thumbnail image preview of the web page associated with the "moused over" link may be presented to the user, thereby allowing the user to see for him or herself a preview of the content available on the linked to web page.

Figure 1:
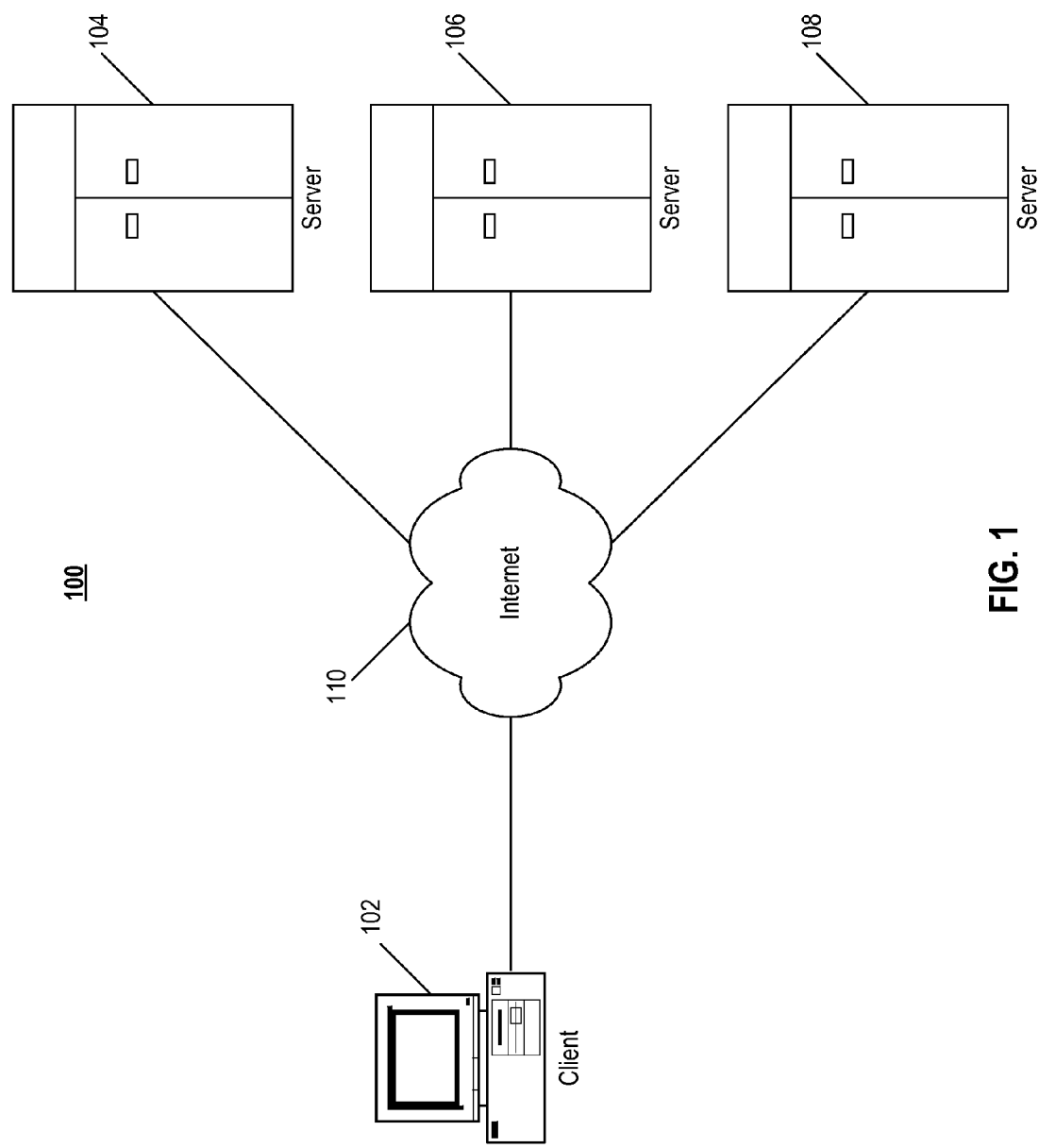
FIG. 1 is a block diagram of an example of a communications system.

FIG. 1 is a block diagram of an example of a communications system. Briefly, the communications system includes a client computer and three web servers electronically connected over the Internet. The client computer includes a web browser that is configured to access web pages and/or other resources made available by the web servers.

In more detail, and as illustrated in FIG. 1, communications system 100 includes a client computer 102 which is electronically connected to web servers 104, 106, and 108 through over the Internet 110.

Client computer 102 and web servers 104, 106, and 108 each may be implemented by, for example, a general purpose computer capable of responding to and executing instructions in a defined manner, a personal computer, a special-purpose computer, a workstation, a server, a notebook or laptop computer, a personal digital assistant ("PDA"), a wireless telephone, a device, a component, other equipment, or some combination of these items that is capable of responding to and executing instructions. In addition, client computer 102 and web servers 104, 106, and 108 each may include a central processing unit (CPU) and memory/storage devices that store data and various programs such as operating systems and application programs. Furthermore, client computer 102 and web servers 104, 106, and 108 each also may include an input/output (I/O) device and peripheral equipment such as a communications card or device (e.g., a modem or network adapter) for exchanging data with over the Internet 110.

Client computer 102 and web servers 104, 106, and 108 each may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client computer 102 or web servers 104, 106, and 108.

The Internet 110 includes hardware and/or software capable of enabling direct or indirect communications between client computer 102 and web servers 104, 106, and 108. Additionally or alternatively, the Internet 110 may include hardware and/or software capable of enabling direct or indirect communications between client computer 102 and other communications devices (not shown) connected to the Internet 110. As such, the Internet 110 may include direct links between client computer 102, web servers 104, 106, and 108, and other communications devices (not shown) connected to the Internet 110. Additionally or alternatively, the Internet 110 may include one or more sub-networks (not shown) between the client computer 102, web servers 104, 106, and 108, and/or other communications devices (not shown) connected to the Internet 110. Each network or sub-network may include, for example, a wired or wireless data pathway capable of carrying and receiving data. Examples of such networks or sub-networks include a wide area network (WAN), a local area network (LAN), analog or digital wired or wireless telephone networks, radio, television, cable, satellite, and/or any other delivery mechanisms capable of carrying data.

Figure 2:
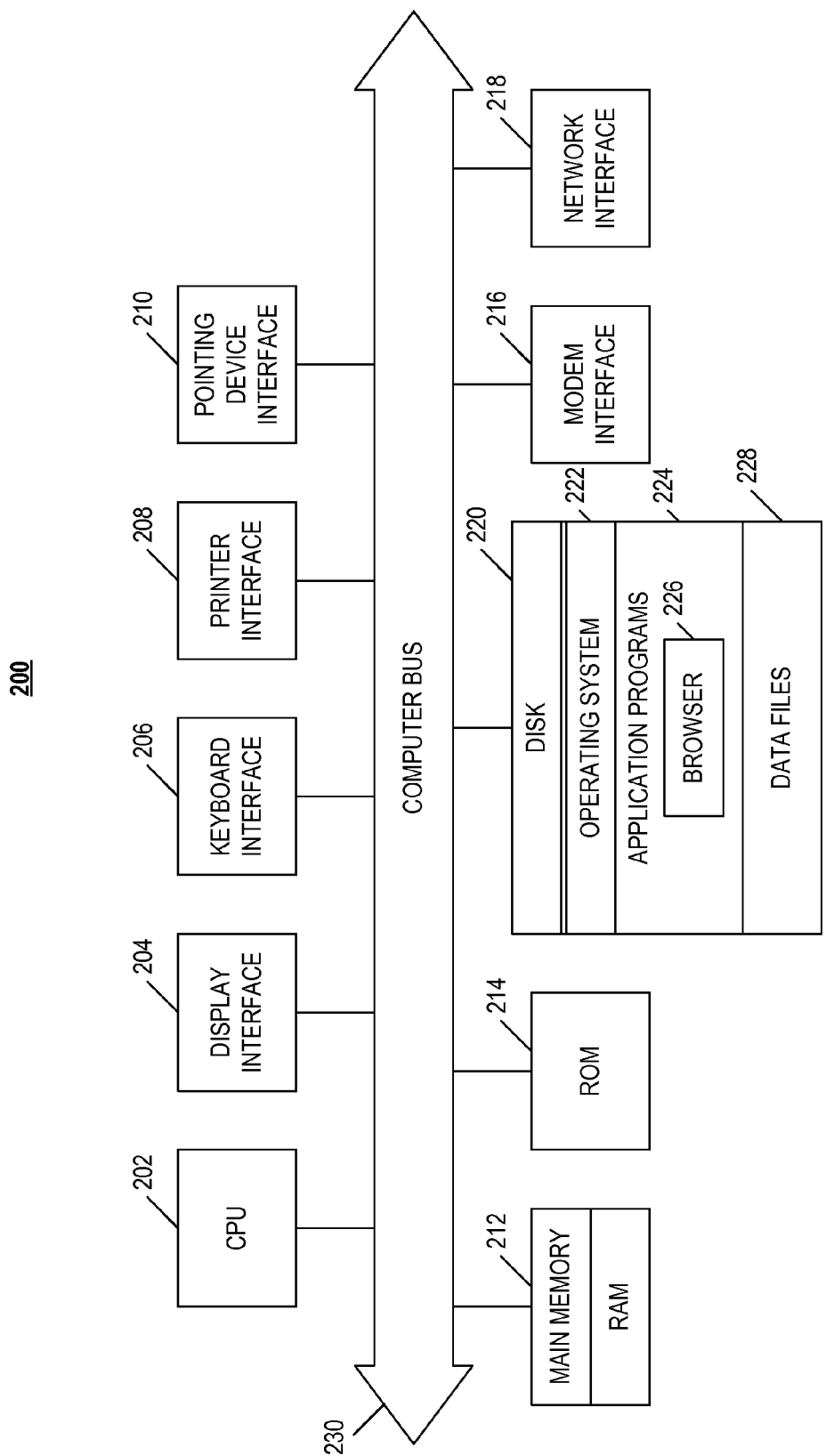
FIG. 2 is a block diagram of an example of a computer architecture.

FIG. 2 is a block diagram of an example of a computer architecture 200 suitable for implementing client computer 102. The computer architecture includes: CPU 202 where computer instructions are processed; display interface 204 which provides a communication interface and processing functions for rendering graphics, images, and text on a display; keyboard interface 206 which provides a communication interface to a keyboard; printer interface 208 which provides a communication interface to a hardcopy output device; pointing device interface 210 which provides a communication interface to a mouse or an equivalent processing device; random access memory (RAM) 212 where computer instructions and data can be stored in a volatile memory device for processing by CPU 202; read-only memory (ROM) 214 where invariant low-level system code or data for basic system functions such as basic I/O, startup, or reception of keystrokes from a keyboard are stored in a non-volatile memory device; modem interface 216 which provides a communication interface to a computer network over a modem connection; computer network interface 218 which provides a communication interface to a computer network over a computer network connection; and disk 220

(e.g., a fixed disk, a removable disk, or a combination thereof). The disk 220 stores computer executable instructions for an operating system 222 and application programs 224, including, for example, a web browser 226, as well as data files 228. Data bus 230 provides bi-directional communication between the constituent devices and CPU 202.

RAM 212 interfaces with computer bus 230 so as to provide quick RAM storage to CPU 202 during execution of software programs such as the operating system 222, application programs 224, including, for example, the web browser 226, and device drivers. More specifically, CPU 202 loads computer executable instructions from disk 220 or other memory media into a region of RAM 212 in order to execute software programs. Data, such as, for example, data related to web browsing, is stored in RAM 212, where the data is accessed by CPU 202 during execution.

FIG. 2 illustrates one example of a computer architecture suitable for implementing client computer 102. Nevertheless, other architectures and communications devices also may be used to implement client computer 102.

Figure 3:
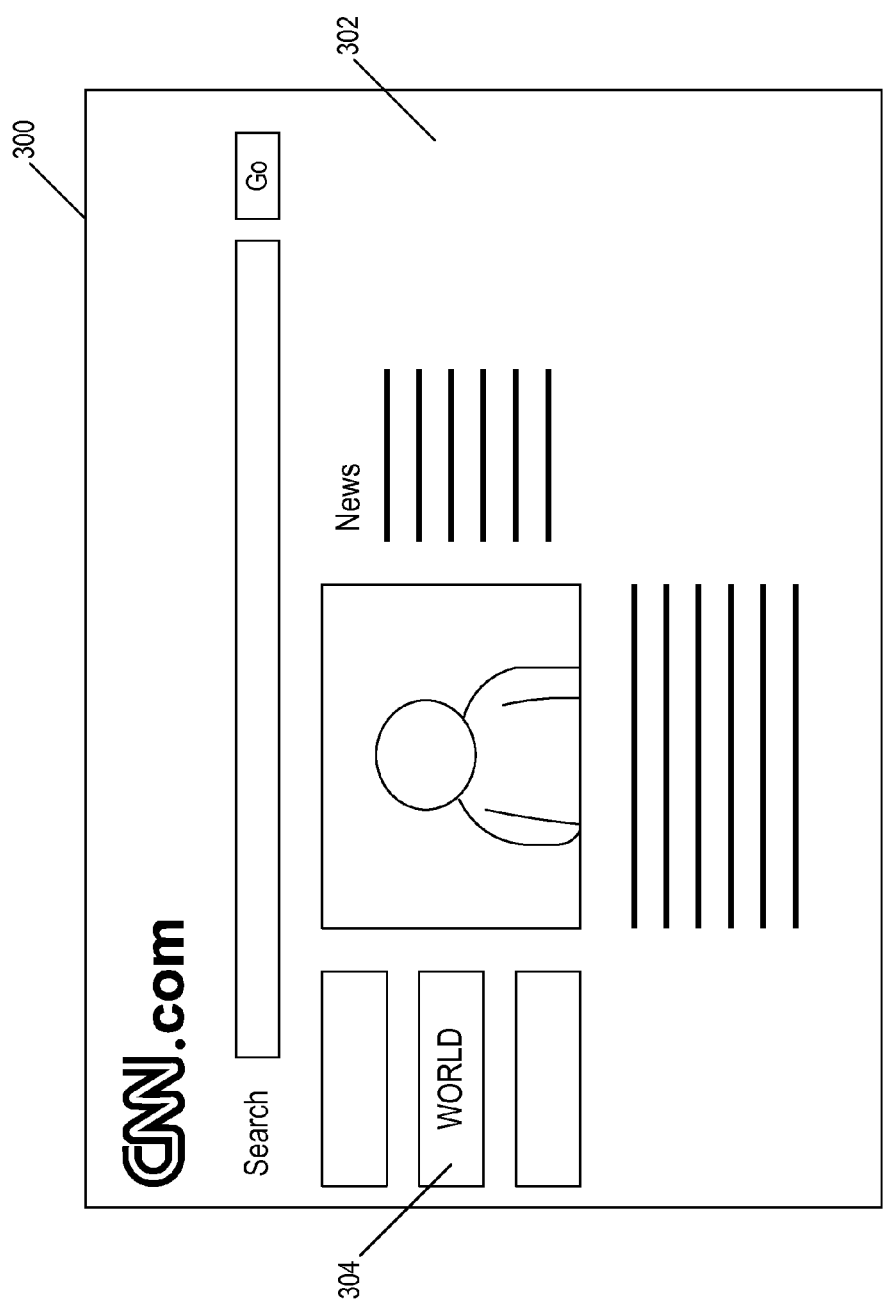
FIG. 3 is a screenshot of a web browser interface on a client computer

FIG. 3 is a screenshot of a web browser interface 300 displayed in connection with a with a web browser running on a client computer such as, for example, client computer 102 of FIG. 1. As illustrated in FIG. 3, the web browser interface displays a web page 302 that provides access to a number of other web pages and resources through embedded links. For example, embedded link 104, associated with the textual description "World" provides access to a second web page.

In one implementation, in addition to displaying the web page 302 currently in view, the web browser associated with the web browser interface 300 is configured to prefetch at least one web page or other resource made accessible through embedded links on the web page 302. For example, the web browser may be configured to prefetch the web page made accessible through embedded link 104. In addition to prefetching the at least one web page or other resource, the web browser also is configured to generate a thumbnail image preview of the at least one prefetched web page or resource. The thumbnail image preview of the web page or resource then may be displayed to a user to provide the user with a preview of the content available from the linked to web page or resource.

Figure 4:
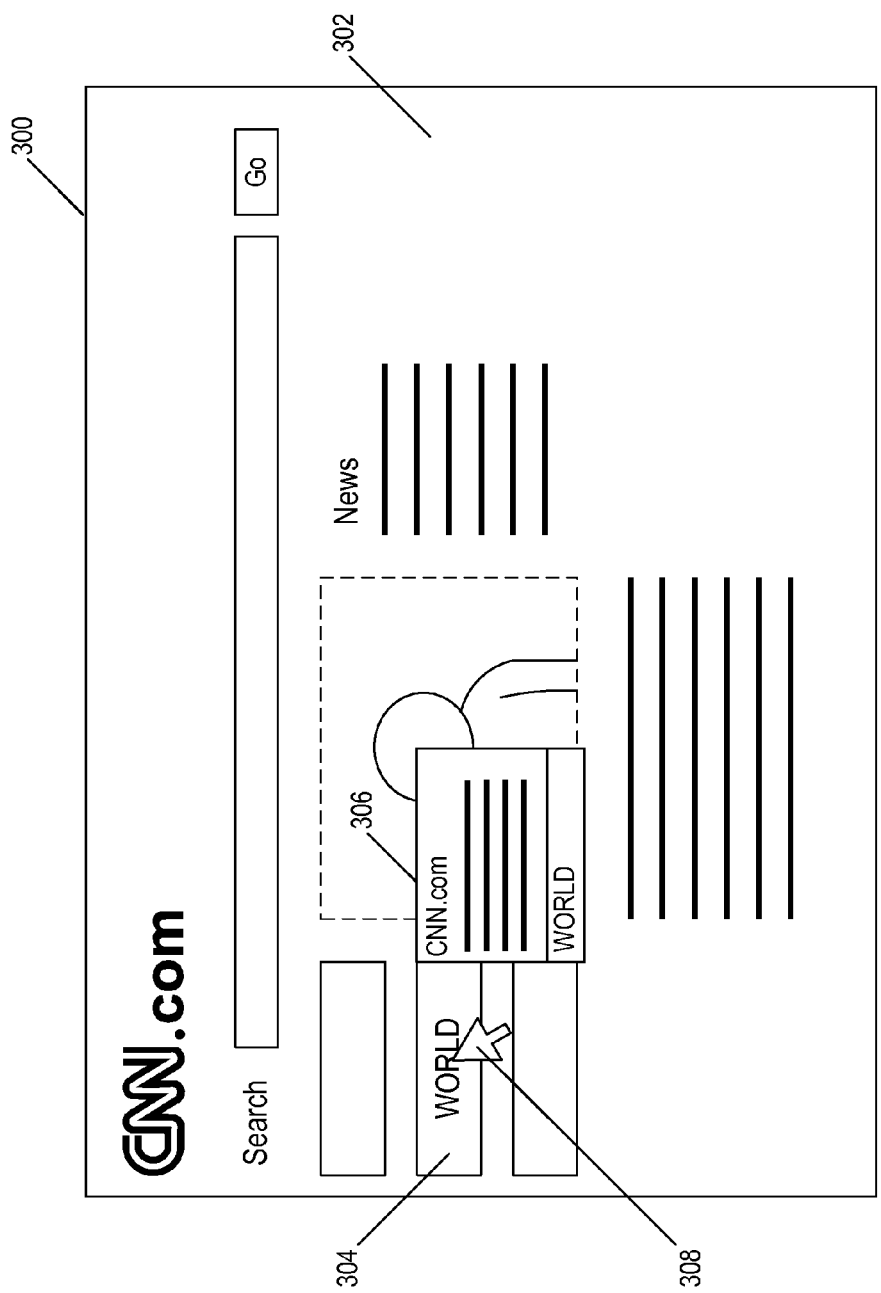
FIG. 4 is a screenshot of the web browser interface of FIG. 3 that illustrates the display of a thumbnail image preview of a web page that is made accessible by an embedded link in the web page currently in view.

FIG. 4 is a screenshot of the web browser interface 300 of FIG. 3. FIG. 4 illustrates the display of a thumbnail image preview 308 of a web page made accessible by an embedded link in the web page 302 currently in view and that has been prefetched by the web browser. As illustrated in FIG. 4, the thumbnail image preview 306 of the web page made accessible through embedded link 104 serves to supplement the textual description "World" associated with embedded link 104. In this manner, the thumbnail image preview 306 may provide a more useful indication of the content of the web page made accessible through embedded link 104 than the textual description "World," thereby enabling a user to make a more informed decision about whether or not to select the embedded link 104 in order to access the web page or other resource made available through the embedded link 104.

The thumbnail image preview 306 of FIG. 4 is a scaled version of the web page made accessible through embedded link 104. That is to say, in generating the thumbnail image preview 306 of the web page made accessible through embedded link 104, the web browser reduced the size of the features of the web page. As a result, the thumbnail image preview 306 enables a user to view an image of the web page made accessible through embedded link 104 that is representative of what the web page would look like when rendered and maximized in the web browser interface 300 without significantly obscuring the web page 302 currently in view and/or consuming a significant amount of screen real estate. As illustrated in FIG. 4, the features of the web page made accessible through embedded link 104 have been scaled proportionally. That is to say, each feature of the web page has been reduced by the same factor. However, this need not be the case. In some implementations, different features may be scaled by different factors. For example, features of a web page determined to be of particular importance may be reduced by a smaller factor than other features such that the features determined to be of particular importance may be displayed more prominently than the other features in the thumbnail image preview.

Thumbnail image previews of web pages and/or resources generated by creating thumbnail images of prefetched web pages and/or resources may be used to provide previews of web pages and/or resources made accessible through links embedded in web pages in a variety of different fashions.

As illustrated in FIG. 4, the web browser interface 300 displays a thumbnail image preview 306 of the web page made accessible through embedded link 104 in response to a cursor 308 associated with a pointing device, such as, for example, a mouse, hovering over embedded link 104. That is to say, thumbnail image preview 306 of the web page made accessible through embedded link 304 in web page 302 is illustrated as being displayed in response to a "mouse over" of the embedded link. However, a thumbnail image preview of a web page made accessible through an embedded link in a web page also may be displayed in response to other triggering events. For instance, a thumbnail image preview of a web page made accessible through an embedded link in a web page may be displayed in response to selection of the embedded link by a "mouse click" (e.g., left click) instead of in response to a "mouse over." Additionally, a thumbnail image preview of a web page made accessible through an embedded link in a web page may be displayed in response to selection of the embedded link using a keystroke, such as, for example, "Tab," on a keyboard.

Alternatively, a thumbnail image preview of a web page made accessible through an embedded link in a web page may be displayed persistently, instead of in response to a triggering event. In some implementations, the web browser may prefetch and generate thumbnail image previews of one or more web pages made accessible through a particular web page before actually rendering the particular web page itself. In such implementations, the web browser may render the particular web page and display the thumbnail image previews of the one or more web pages concurrently. That is to say, the thumbnail image previews of the one or more web pages may be displayed concurrently with the particular web page from the very moment the particular web page is first rendered, or upon their accessibility upon prefetching.

In some implementations, a thumbnail image preview of a web page made accessible through an embedded link in a web page may be a passive image. That is to say, in some implementations, links and/or other controls that would otherwise be active and/or selectable in the previewed web page may not be active and/or selectable in the thumbnail image preview. For example, the thumbnail image preview may be a passive image of the web page made accessible through the embedded link that is generated in accordance with an image file format such as, for example, a bitmap image file format, a jpeg image file format, a jpeg2 image file format, a gif image file format, and a png image file format. In other implementations, a thumbnail image preview of a web page made accessible through an embedded link in a web page may be active. That is to say, links and/or other controls that are active and/or selectable in the previewed web page also may be active and/or selectable in the thumbnail image preview of the web page. For example, the thumbnail image preview of the web page may be a reduced size version of the previewed web page.

Additionally or alternatively, a thumbnail image preview of a previewed web page may be selectable itself. For example, selection of the thumbnail image preview may prompt the web browser to navigate to the previewed web page, or, alternatively, selection of the thumbnail image preview may spawn a full-scale display of the previewed web page in a web browser interface. For example, in a tabbed browser interface, such as, for example, the browser interface 300 of FIGS. 3 and 4, the previewed web page may be opened in a new tab in the web browser interface.

In some implementations, a thumbnail image preview of a web page made accessible through an embedded link in a web page currently in view may be displayed in a web browser interface window that is separate and distinct from the web browser interface window in which the web page currently in view is displayed. In other implementations, a thumbnail image preview of a web page made accessible through an embedded link in a web page currently in view may be displayed in the same web browser interface window as the web page currently in view. For example, a thumbnail image preview of a web page made accessible through an embedded link in a web page currently in view may be used to supplement a textual description or other identifier associated with the embedded link in the web page currently in view by embedding the thumbnail image preview in the display of the web page currently in view. For instance, as illustrated in FIG. 4, thumbnail image preview 306 supplements the textual description "World" associated with embedded link 104. In other implementations, a thumbnail image preview of a web page made accessible through an embedded link in a web page currently in view may replace, or otherwise supplant, a textual description or other identifier associated with the embedded link in the web page currently in view.

Figure 5A:
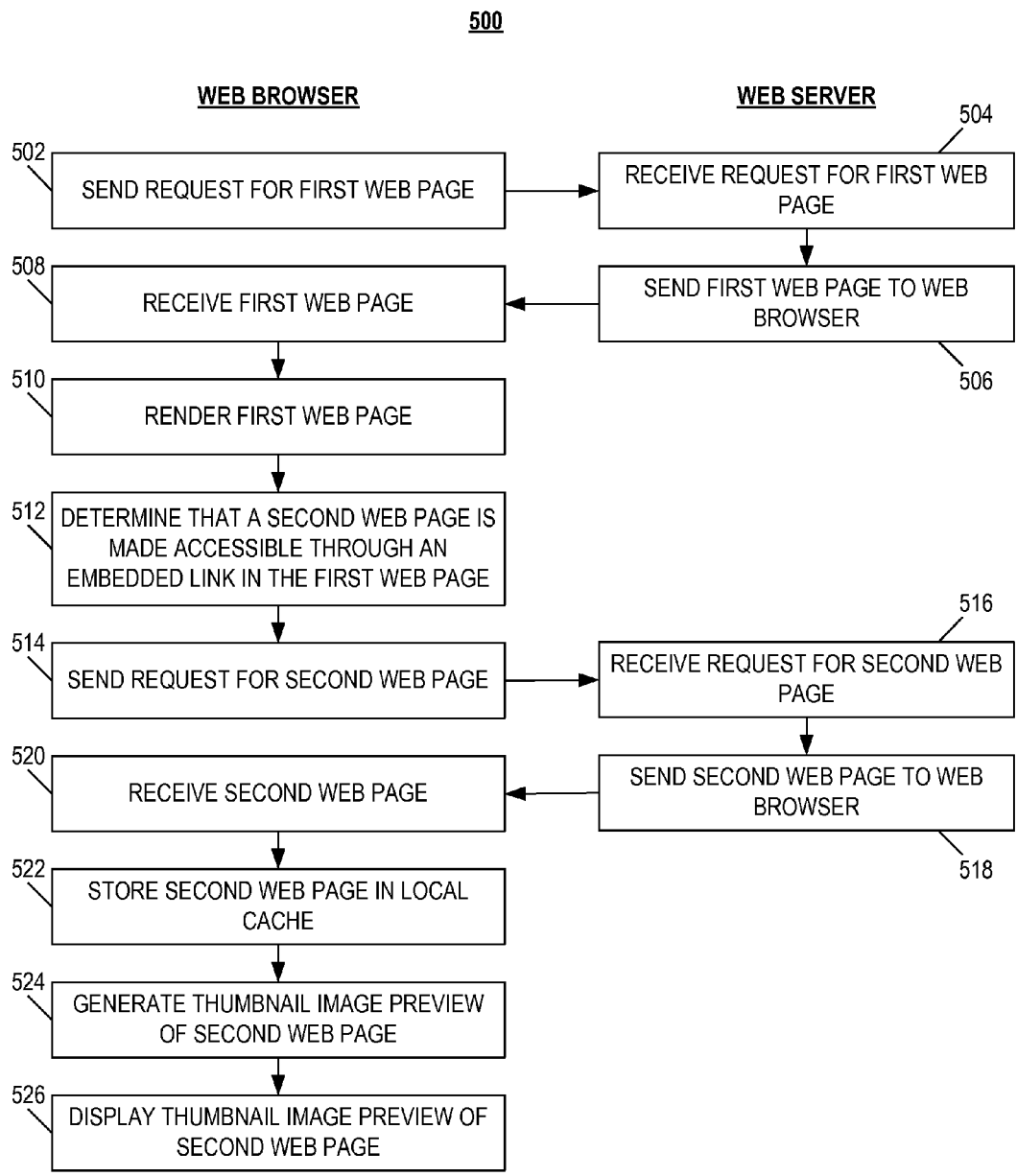
FIGS. 5a-5c are diagrams of processes for generating a thumbnail image preview of a web page that is made accessible by an embedded link in a web page currently in view.

FIG. 5*a* is a diagram of a process 500 for generating a thumbnail image preview of a web page that is made accessible by an embedded link in a web page currently in view that involves a web browser running on a client computer and one or more web servers. The web browser may be, for example, web browser 226 of FIG. 2, the client computer may be, for example, the client computer 102 of FIG. 1, and the one or more web servers may be, for example, one or more of web servers 104, 106, and 108 of FIG. 1.

The process 500 beings when the web browser sends a request for a first web page to the web server (502). The web server receives the request for the first web page (504) and sends the first web page to the web browser in response (506). The web browser receives the first web page from the web server (508) and then renders the first web page (510).

In addition, the web browser determines that a second web page is made accessible through an embedded link in the first web page (512). Based on determining that a second web page is made accessible through an embedded link in the first web page, the web browser sends a request for the second web page, or a portion thereof, to the web server (514). This operation of sending a request to the web server for the second web page, or a portion thereof, based on determining that a second web page is made accessible through an embedded link in the first web page may be referred to generally as prefetching the second web page.

The web server receives the request for the second web page (516) and sends the second web page, or a portion thereof, to the web browser in response (518). The client receives the second web page, or a portion thereof, from the web server (520) and stores the second web page, or a portion thereof, in local cache at the client computer (522). The web browser then generates a thumbnail image preview of the second web page, or a portion thereof (524). Like the prefetched second web page, the thumbnail image preview of the second web page also may be stored locally (e.g., in local cache).

After generating a thumbnail image preview of the second web page, or a portion thereof, the web browser displays a thumbnail image preview of the second web page, or a portion thereof (526). In some implementations, the web browser may display the thumbnail image preview in response to determining that a cursor associated with a pointing device such as, for example, a mouse, is hovering over the link embedded in the first web page through which the second web page is made accessible. Additionally or alternatively, the web browser may display the thumbnail image preview in response to another triggering event, such as, for example, selection of the embedded link using the "Tab" key on a keyboard. In other implementations, the thumbnail image preview may be generated and then displayed persistently, instead of being displayed in response to a triggering event. For example, the web browser may wait to render the first web page until after the thumbnail image preview of the second web page has been generated, and then the web browser may render the first web page at the same time as displaying the thumbnail image preview of the second web page. The thumbnail image preview of the second web page then may be displayed persistently until a user navigates away from the first web page or until the user closes the web browser interface.

Figure 5B:
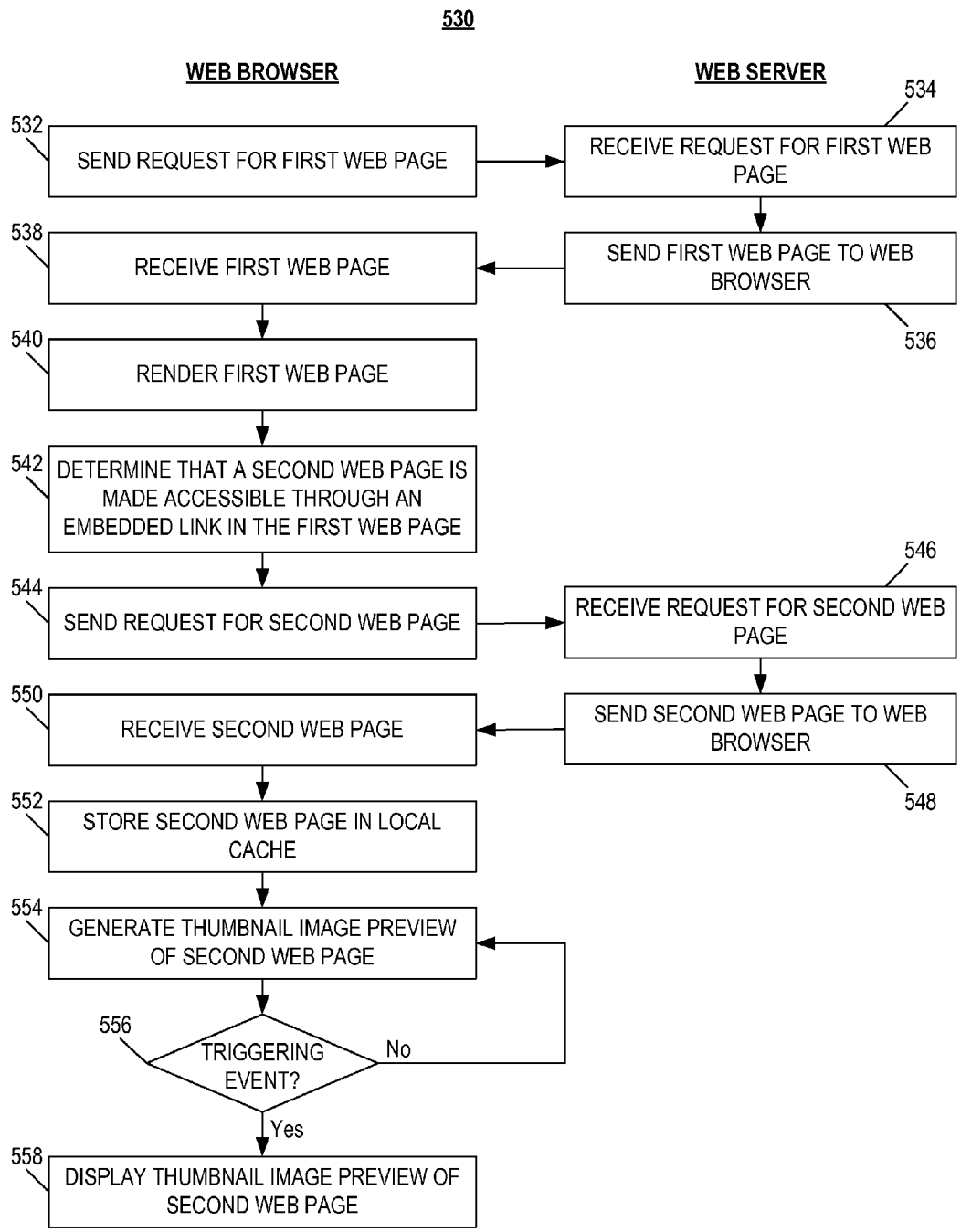

FIG. 5*b* is a diagram of another process 530 for generating a thumbnail image preview of a web page that is made accessible by an embedded link in a web page currently in view that involves a web browser running on a client computer and one or more web servers. The web browser may be, for example, web browser 226 of FIG. 2, the client computer may be, for example, the client computer 102 of FIG. 1, and the one or more web servers may be, for example, one or more of web servers 104, 106, and 108 of FIG. 1.

The process 530 beings when the web browser sends a request for a first web page to the web server (532). The web server receives the request for the first web page (534) and sends the first web page to the web browser in response (536). The web browser receives the first web page from the web server (538) and then renders the first web page (540).

In addition, the web browser determines that a second web page is made accessible through an embedded link in the first web page (542). Based on determining that a second web page is made accessible through an embedded link in the first web page, the web browser sends a request for the second web page, or a portion thereof, to the web server (544). The web server receives the request for the second web page (546) and sends the second web page, or a portion thereof, to the web browser in response (548). The client receives the second web page, or a portion thereof, from the web server (550) and stores the second web page, or a portion thereof, in local cache at the client computer (552). The web browser then generates a thumbnail image preview of the second web page, or a portion thereof (554).

If the web browser determines that a triggering event has occurred (556), the web browser displays a thumbnail image preview of the second web page (558). Otherwise, the process 530 returns to operation 554. Examples of a triggering event may include, a "mouse over" of the embedded link, selection of the embedded link via a mouse click, or selection of the embedded link via a keystroke entered on a keyboard.

Figure 5C:
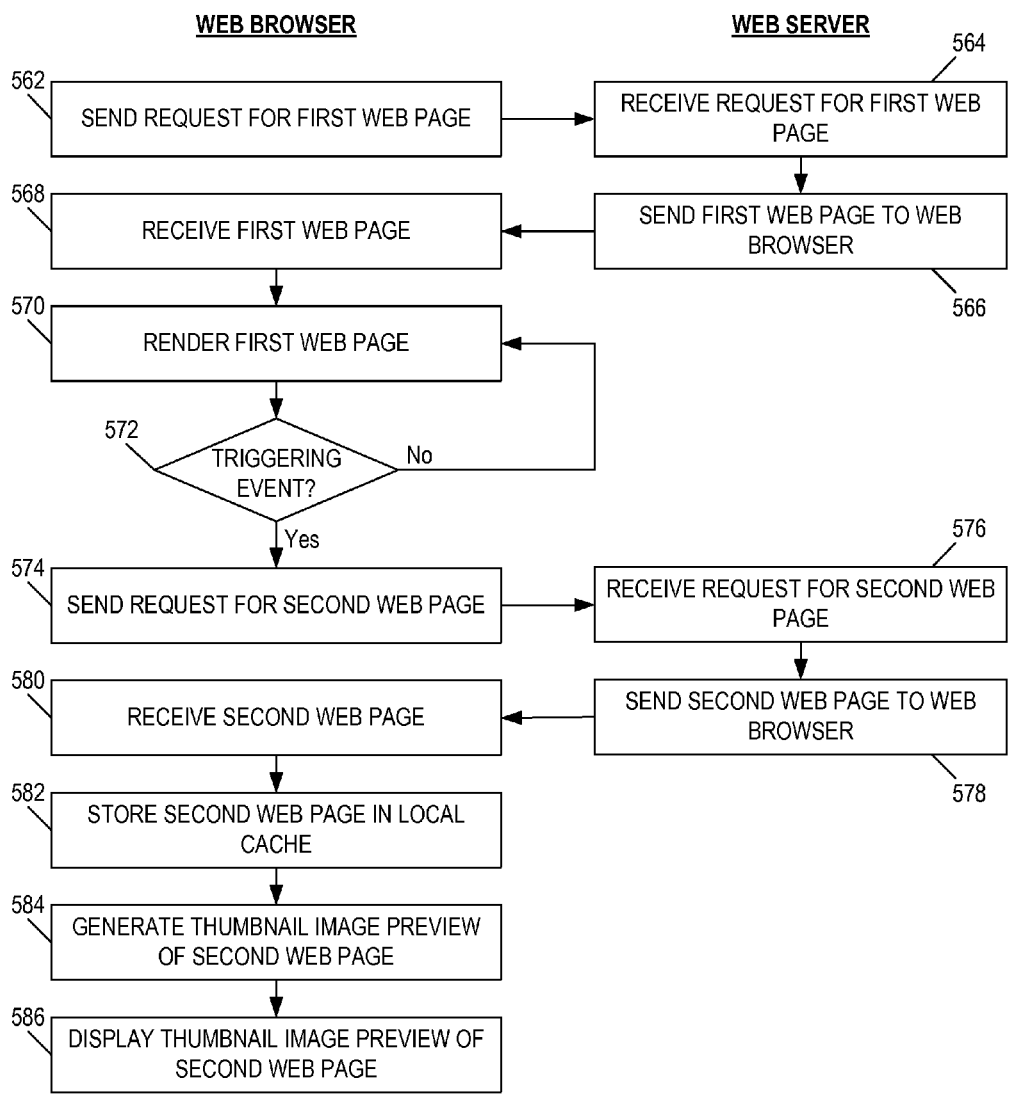

FIG. 5c is a diagram of another process 560 for generating a thumbnail image preview of a web page that is made accessible by an embedded link in a web page currently in view that involves a web browser running on a client computer and one or more web servers. The web browser may be, for example, web browser 226 of FIG. 2, the client computer may be, for example, the client computer 102 of FIG. 1, and the one or more web servers may be, for example, one or more of web servers 104, 106, and 108 of FIG. 1.

The process 560 beings when the web browser sends a request for a first web page to the web server (562). The web server receives the request for the first web page (564) and sends the first web page to the web browser in response (566). The web browser receives the first web page from the web server (568) and then renders the first web page (570).

If the web browser determines that a triggering event occurs (572), the web browser sends a request for a second web page, or a portion thereof; to the web server (574). For example, the web browser may determine that a link to the second web page embedded in the first web page has been "moused over," or otherwise selected (e.g., selected by a mouse click or a keystroke). Therefore, in response to such a "mouse over" or selection of the embedded link in the first web page, the web browser may send a request to the web server for the second web page, or a portion thereof.

The web server 576 receives the request for the second web page (576) and sends the second web page, or a portion thereof, to the web browser in response (578). The web browser receives the second web page, or a portion thereof, (580) and stores the second web page, or a portion thereof, in local cache (582). The web browser then generates a thumbnail image preview of the second web page, or a portion thereof (584) and displays the thumbnail image preview (586). The process 560 illustrated in FIG. 5c differs from the process 500 illustrated in FIG. 5a in that, in process 560, the operation of sending the request for the second web page (574) is triggered by a triggering event such as a "mouse over" of a link to the second web page, while, in process 500, the operation of sending the request for the second web page (514) is triggered by a determination that the second web page is made accessible through an embedded link in the first web page.

In some implementations, a web browser prefetches multiple layers of web pages or other resources made accessible through a link on a web page currently in view. For example, the CNN.com homepage may be currently in view, and the CNN.com homepage may provide access to a second web page that itself provides access to three additional web pages (i.e., a third web page, a fourth web page, and a fifth web page) through three corresponding links embedded in the second web page. In such a scenario, in addition to prefetching the second web page, the web browser also prefetches the third web page, the fourth web page, and the fifth web page and stores the four web pages (i.e., the second web page, the third web page, the fourth web page, and the fifth web page) in local cache. Thereafter, the web browser generates thumbnail image previews of the second web page, the third web page, the fourth web page, and the fifth web page and displays the thumbnail image previews in the form of a thumbnail image preview tree to provide a user of the web browser with a preview of the content available through the second web page as well as a preview of the content available through the web pages made accessible through embedded links on the second page.

Figure 6:
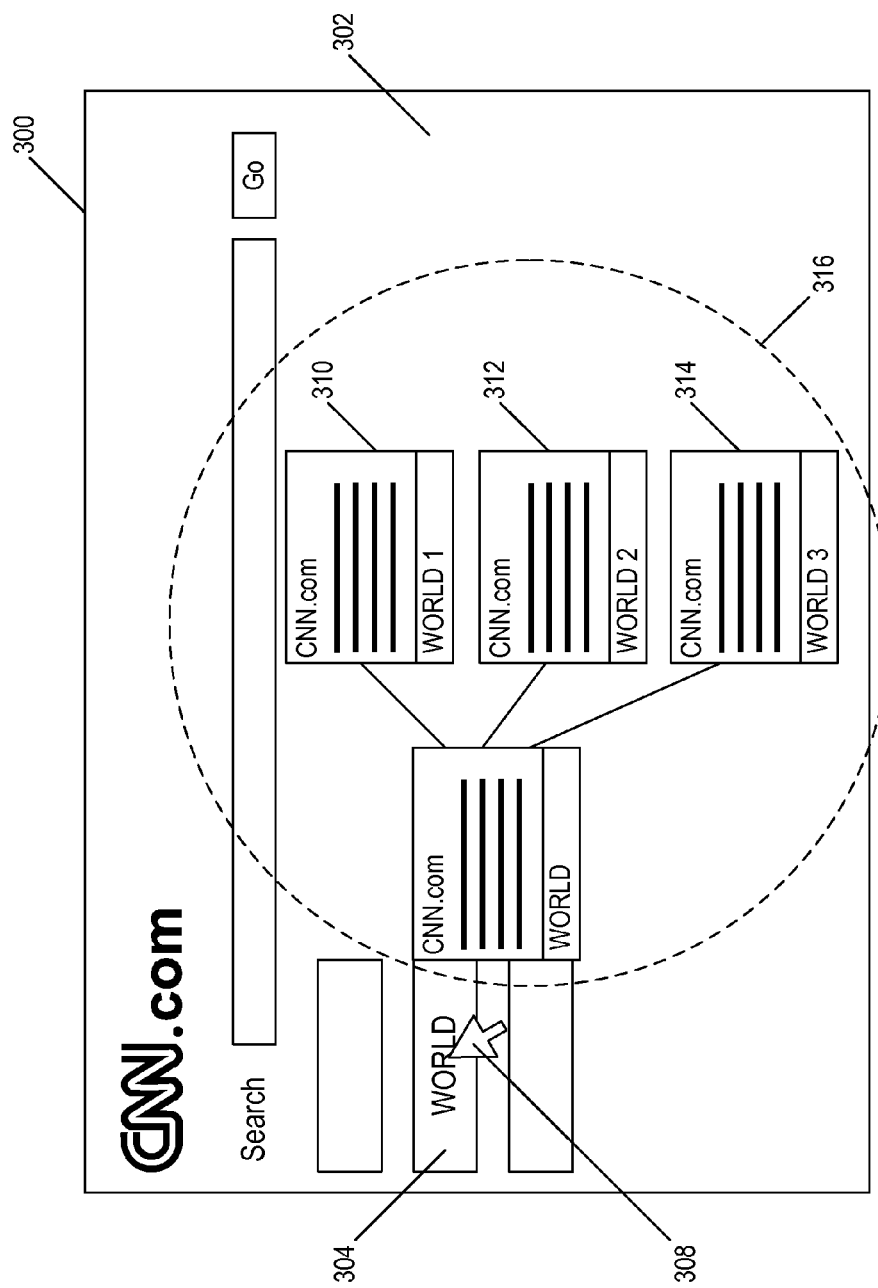
FIG. 6 is a screenshot of the web browser interface of FIG. 3 that illustrates the display of a thumbnail image preview of a web page that is made accessible by an embedded link in the web page currently in view as well as the display of thumbnail image previews of three web pages made accessible through embedded links in the web page that is made accessible by the embedded link in the web page currently in view.

FIG. 6 is a screenshot of the web browser interface 300 of FIG. 3 that illustrates the display of a thumbnail image preview of a web page that is made accessible by an embedded link in the web page currently in view as well as the display of thumbnail image previews of three web pages made accessible through embedded links in the web page that is made accessible by the embedded link in the web page currently in view.

As illustrated in FIG. 6, the web page made accessible through embedded link 104 provides access to three additional web pages through three corresponding embedded links. In addition to being configured to prefetch and generate a thumbnail image preview of the web page accessible through embedded link 104, the web browser also is configured to prefetch and generate thumbnail image previews of the three other web pages accessible through embedded links on the web page accessible through embedded link 104. Thereafter, the web browser interface 300 is configured to display a thumbnail image preview 306 of the web page made accessible through embedded link 104 as well as thumbnail image previews 310, 312, and 314 of the three web pages linked to by the web page made accessible through embedded link 104 in response to a cursor 308 hovering over embedded link 104.

The thumbnail image preview 308 of the web page accessible through embedded link 104 and the thumbnail image previews 310, 312, and 314 of the web pages accessible through embedded links on the web page accessible through embedded link 104 are displayed in a thumbnail image preview tree 316 that illustrates the hierarchical relationship between the web pages corresponding to thumbnail image preview images 306, 310, 312, and 314. Although FIG. 6 illustrates a thumbnail image preview tree 314 having only two layers, in some implementations, a web browser is configured to prefetch and generate thumbnail image previews of more than two layers of web pages or other resources.

In some implementations, a messaging platform, such as, for example, an instant messaging platform, may enable a message sender to send a link to a web page or other resource to a message recipient. In such implementations, the instant messaging application of the message recipient may be configured to prefetch and generate a thumbnail image preview of the web page or other resource that corresponds to the link sent to the message recipient by the message sender.

Figure 7A:
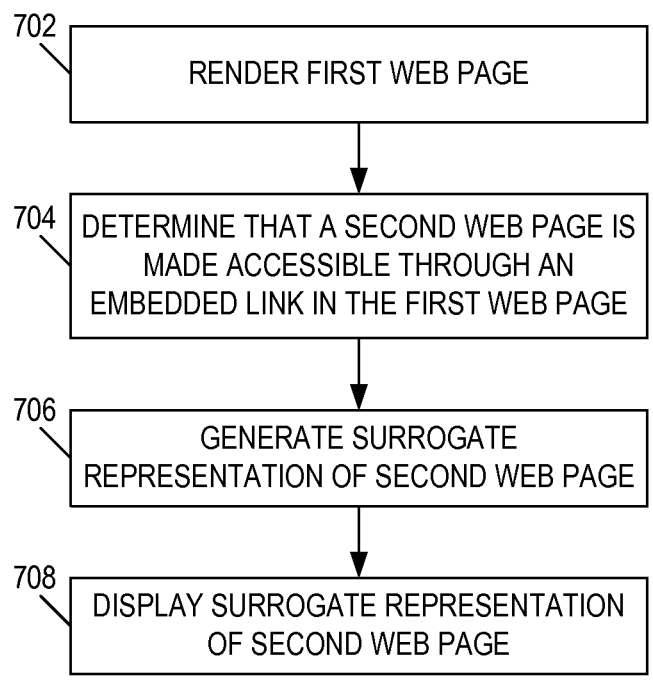
FIG. 7a is a flowchart of a process for generating a surrogate representation of a second web page that is made accessible by an embedded link in a web page currently in view.

FIG. 7a is a flowchart of a process for generating a surrogate representation of a second web page that is made accessible by an embedded link in a web page currently in view. The process begins by rendering a first web page (702). For example, a web browser may render the first web page in response to a user instruction to navigate to the first web page. Thereafter, in response to determining that a second web page is made accessible through an embedded link in the first web page (704), a surrogate representation of the second web page is generated (706). In some implementations, a web browser may determine that a second web page is made accessible through an embedded link in the first web page and then access a surrogate image library (either local or hosted) to retrieve a surrogate image that is representative of the second web page. Such surrogate images may not provide a preview of the actual content available from the second web page. Rather, the surrogate images may simply be representative of the content available from the second web page. For example, there may be a surrogate image that is representative of "news" web pages and a surrogate image that is representative of "entertainment" web pages. When a web browser determines that a web page made accessible through an embedded link in a first web page is a "news" web page, the web page may generate and display a surrogate image that is representative of "news" web pages. Similarly, if a web browser determines that a web page made accessible through an embedded link in a first web page is an "entertainment" web page, the web page may generate and display a surrogate image that is representative of "entertainment" web pages.

Figure 7B:
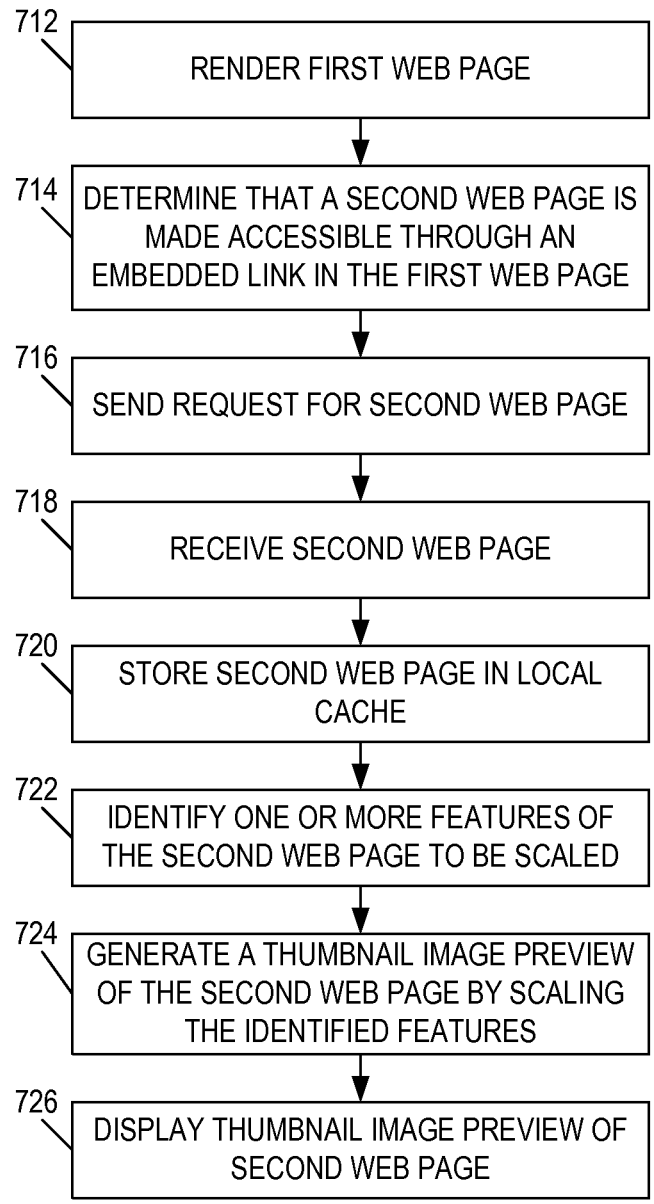
FIGS. 7b and 7c are flowcharts of processes for generating a thumbnail image preview of a web page that is made accessible by an embedded link in a web page currently in view.

FIG. 7b is a flowchart of another process 710 for generating a thumbnail image preview of a web page that is made accessible by an embedded link in a web page currently in view that may be performed by, for example, a web browser running on a client computer. The process 700 begins by rendering a first web page (712). In response to determining that a second web page is made accessible through an embedded link in the first web page (714), a request is sent for the second web page (716). Thereafter, the second web page is received (718) and stored in local cache (718).

One or more features of the second web page are then identified as features to be scaled (722). For example, all of the features (e.g., text, links, images, etc.) of the second web page may be identified as features to be reduced in size. Alternatively, some of the features of the second web page may be identified as features to be amplified, or displayed more prominently, whereas other features of the second web page may be identified as features to be reduced in size. After identifying the one or more features of the second web page to be scaled (722), a thumbnail image preview of the second web page is generated by scaling (e.g., reducing and/or amplifying) the identified features (724). Thereafter, the thumbnail image preview of the second web page is displayed (726). For example, the thumbnail image preview may be displayed in response to a triggering event (e.g., a "mouse over" or other selection) or the thumbnail image preview may be displayed upon generation of the thumbnail image preview.

Figure 7C:
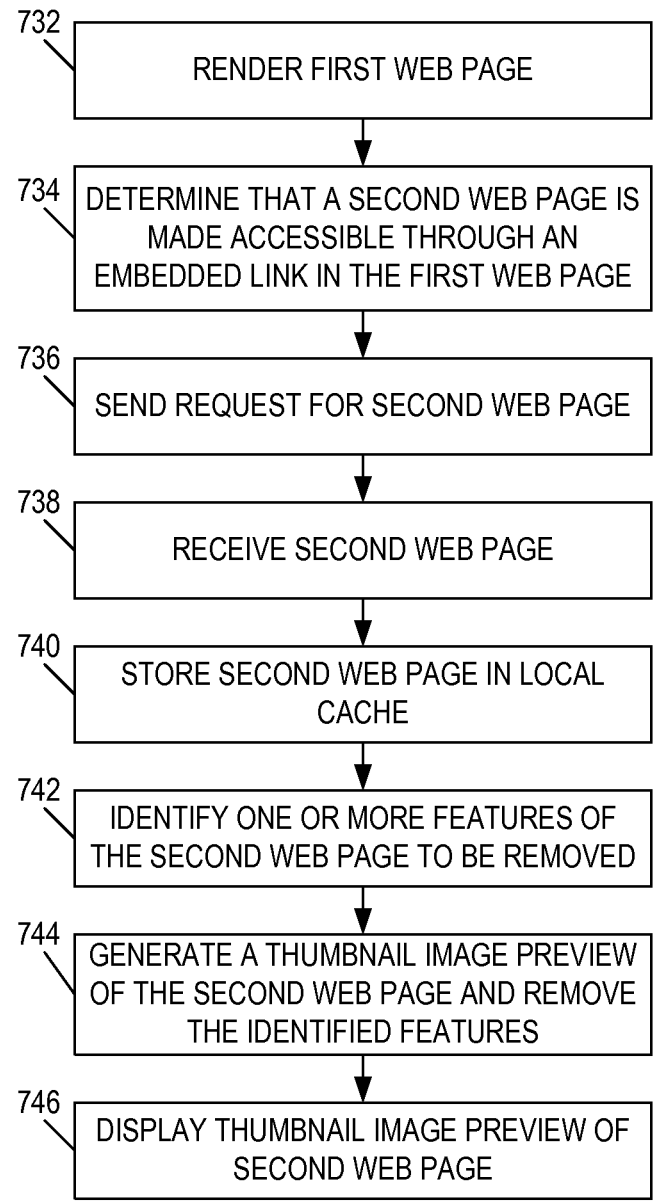

FIG. 7c is a flowchart of another process 730 for generating a thumbnail image preview of a web page that is made accessible by an embedded link in a web page currently in view that may be performed by, for example, a web browser running on a client computer. The process 730 begins by rendering a first web page (732). In response to determining that a second web page is made accessible through an embedded link in the first web page (734), a request is sent for the second web page (736). Thereafter, the second web page is received (738) and stored in local cache (740).

One or more features of the second web page are then identified as features to be removed from the second web page (742). For example, certain features may be identified as extraneous features that are not necessary to provide a preview of the content available on the second web page (e.g., advertisements embedded within the second web page). Therefore, these features may be identified as features to be removed from the second web page. Additionally or alternatively, certain features may be identified as features that will not reproduce well at a lower scale (e.g., a high resolution image). Accordingly, such features may be identified as features to be removed from the second web page. After identifying the one or more features of the second web page to be removed (742), a thumbnail image preview of the second web page is generated by removing the identified features (744). Thereafter, the thumbnail image preview of the second web page is displayed (746). For example, the thumbnail image preview may be displayed in response to a triggering event (e.g., a "mouse over" or other selection) or the thumbnail image preview may be displayed upon generation of the thumbnail image preview.

Figure 7D:
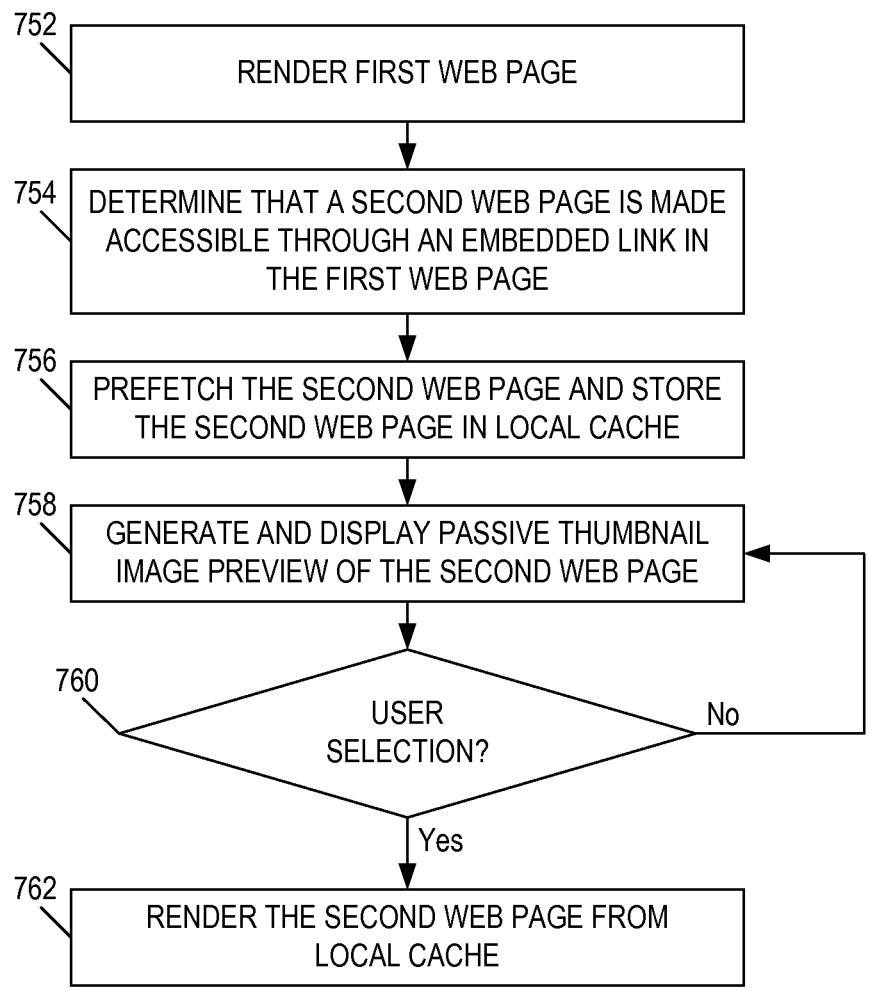
FIG. 7d is a flowchart of a process for generating a passive thumbnail image preview of a web page that is made accessible by an embedded link in a web page currently in view and for enabling a user to select the passive thumbnail image preview.

FIG. 7d is a flowchart of a process 750 for generating a passive thumbnail image preview of a web page that is made accessible by an embedded link in a web page currently in view and for enabling a user to select the passive thumbnail image preview. The process 750 may be performed by, for example, a web browser running on a client computer.

The process 750 begins by rendering a first web page (752). In response to determining that a second web page is made accessible through an embedded link in the first web page (754), the second web page is prefetched and stored in local cache (756). Thereafter, a passive thumbnail image preview of the second web page is generated and displayed (758). That is to say, a thumbnail image preview of the second web page is generated in which links and/or other controls that would otherwise be active and/or selectable in the second web page are not active and/or selectable in the thumbnail image preview. For example, the thumbnail image preview may be a passive image of the second web page that is generated in accordance with an image file format such as, for example, a bitmap image file format, a jpeg image file format, a jpeg2 image file format, a gif image file format, and a png image file format.

In response to a determination that the thumbnail image preview of the second web page has been selected (760), the second web page is rendered from local cache (762). Otherwise, the process 750 returns to operation 758. In some implementations, a web browser may determine that the thumbnail image preview has been selected in response to, for example, a mouse click (e.g., left mouse click) or a keystroke (e.g., Enter). Because the second web page is rendered from local cache it may be accessed and rendered more quickly than if it had to be fetched from a remote web server.

Figure 7E:
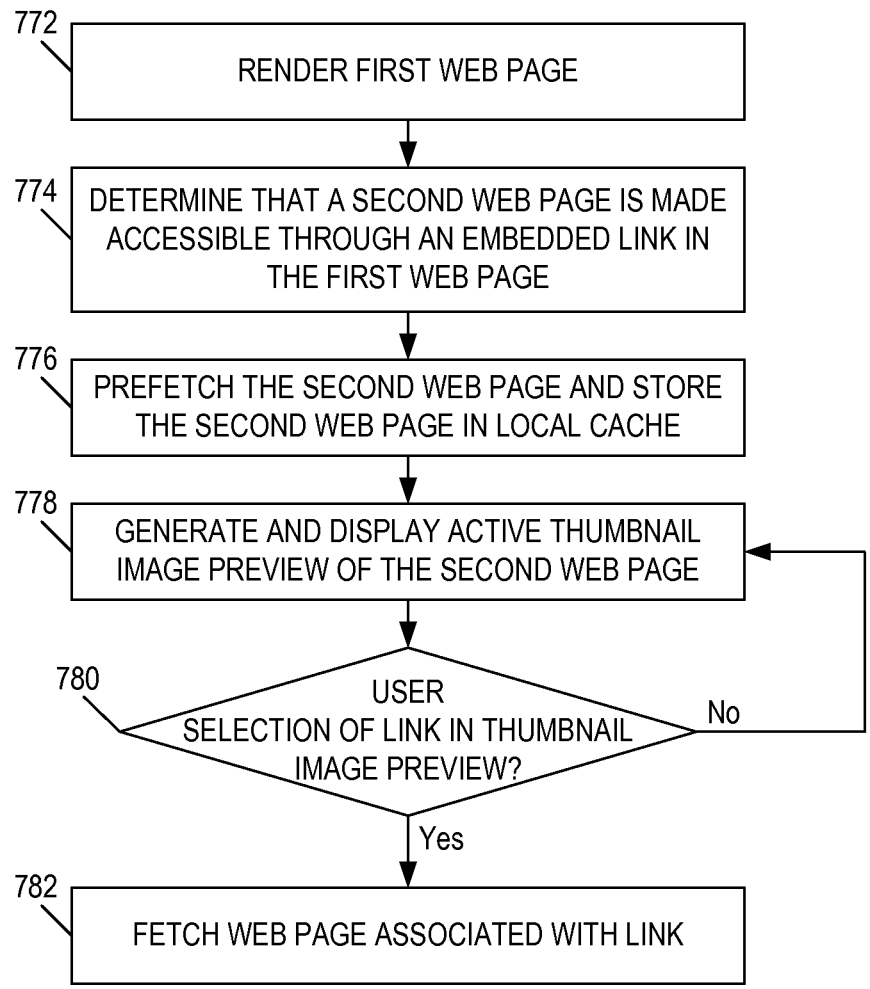
FIG. 7e is a flowchart of a process for generating an active thumbnail image preview of a web page that is made accessible by an embedded link in a web page currently in view and for enabling a user to interact with active elements of the active thumbnail image preview.

FIG. 7e is a flowchart of a process 770 for generating an active thumbnail image preview of a web page that is made accessible by an embedded link in a web page currently in view and for enabling a user to interact with active elements of the active thumbnail image preview. The process 770 may be performed by, for example, a web browser running on a client computer.

The process 770 begins by rendering a first web page (772). In response to determining that a second web page is made accessible through an embedded link in the first web page (774), the second web page is prefetched and stored in local cache (776). Thereafter, an active thumbnail image preview of the second web page is generated and displayed (778). That is to say, a thumbnail image preview of the second web page is generated in which links and/or other controls that are active and/or selectable in the previewed web page also are active and/or selectable.

In response to a determination that an active link in the thumbnail image preview of the second web page has been selected (780), the web page associated with the selected link is fetched (782). Otherwise, the process 770 returns to operation 780. In some implementations, the web page associated with the selected link may be fetched from a remote web server. In other implementations, the web page associated with the selected link may have been prefetched by a web browser. Therefore, in such implementations, the web page associated with the selected link may be fetched from local cache.

A user may interact with an active thumbnail image preview in other ways. For example, an active thumbnail image preview of a web page that includes a field for entering a search query (e.g., http://search.aol.com) may enable a user to enter a search query and perform a search via the active thumbnail image preview of the web page.

Figure 8:
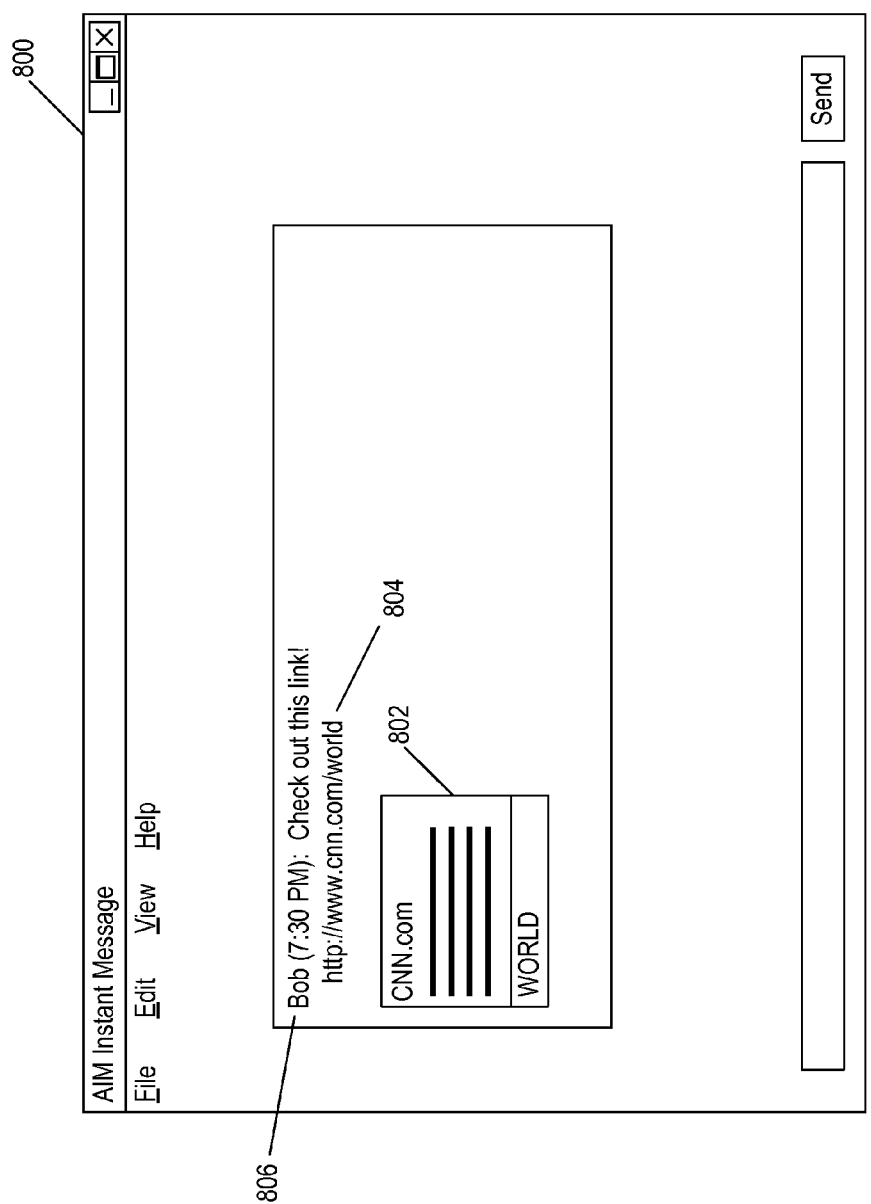
FIG. 8 is an example of a graphical user interface (GUI) of an instant messaging application that illustrates the display of a thumbnail image preview of a web page corresponding to a link sent to an instant message recipient in an instant message from an instant message sender.

FIG. 8 is an example of a GUI 800 of an instant messaging application that illustrates the display of a thumbnail image preview 802 of a web page corresponding to a link 804 sent to an instant message recipient in an instant message 806 from an instant message sender. As illustrated in FIG. 8, the GUI displays an instant message 806 sent to an instant message recipient from an instant message sender that includes a link 804 to a web page. In response to receiving the instant message 806 with the link 804 to the web page, the instant messaging recipient's instant messaging application prefetches and generates a thumbnail image preview 802 of the web page, or a portion thereof, corresponding to the link 804.

As illustrated in FIG. 8, the thumbnail image preview 802 serves to supplement the link 804 to the web page and any textual description of the web page provided by the instant message sender. In some implementations, however, a thumbnail image preview of a web page corresponding to a link received in an instant message may replace, or otherwise supplant, the link itself in the instant message.

In some implementations, the thumbnail image preview 804 may be displayed at the same time as the instant message 806. Alternatively, in other implementations, the thumbnail image preview 802 may be displayed in response to a triggering event. For example, the thumbnail image preview may be displayed in response to a "mouse over" of the link 804 in the instant message 806.

In some implementations, an instant messaging server, or another intermediary device, between the instant message sender and the instant message recipient may prefetch and generate a thumbnail image preview of a web page corresponding to a link sent to the instant message recipient from the instant message sender in an instant message. In such implementations, the instant messaging server may associate the thumbnail image preview of the web page with the instant message from the instant message sender before delivering the instant message and the thumbnail image preview of the link included in the instant message to the instant message recipient.

Figure 9A:
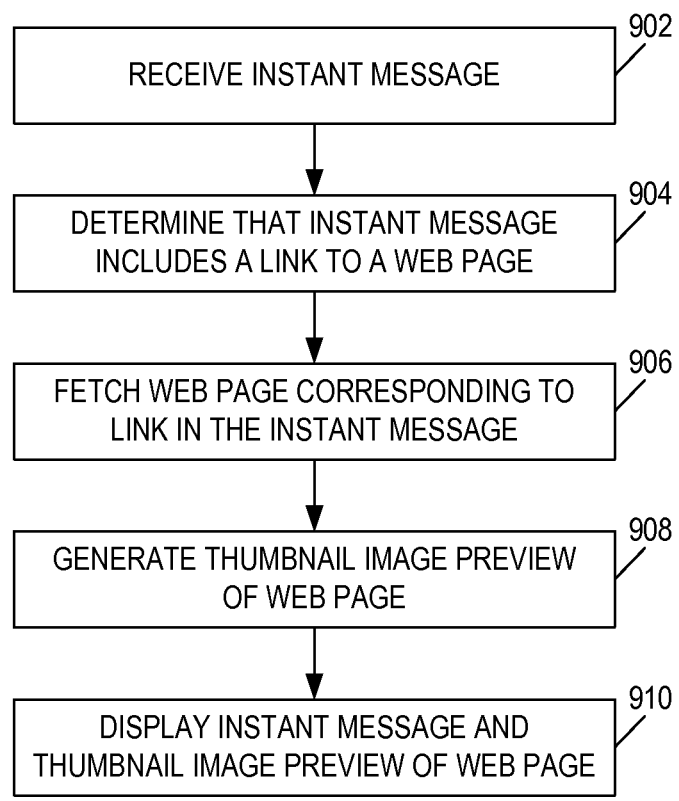
FIG. 9a is flowchart of a process for generating a thumbnail image preview of a web page that is made accessible by a link included in an instant message.

FIG. 9a is flowchart of a process 900 for generating a thumbnail image preview of a web page that is made accessible by a link included in an instant message. The process may be performed by, for example, an instant messaging client application running on a client computer of an instant message recipient. The process 900 begins when an instant message is received (902). For example, an instant message may be received from an instant message sender directly or an instant message may be received from an instant message sender indirectly via a hosted instant messaging system. In response to determining that the instant message includes a link to a web page (904), the web page corresponding to the link in the instant message is fetched (906). In some implementations, the fetched web page may be stored in local cache. Thereafter, a thumbnail image preview of the web page is generated (908) and the instant message and thumbnail image preview of the web page are displayed (910).

Figure 9B:
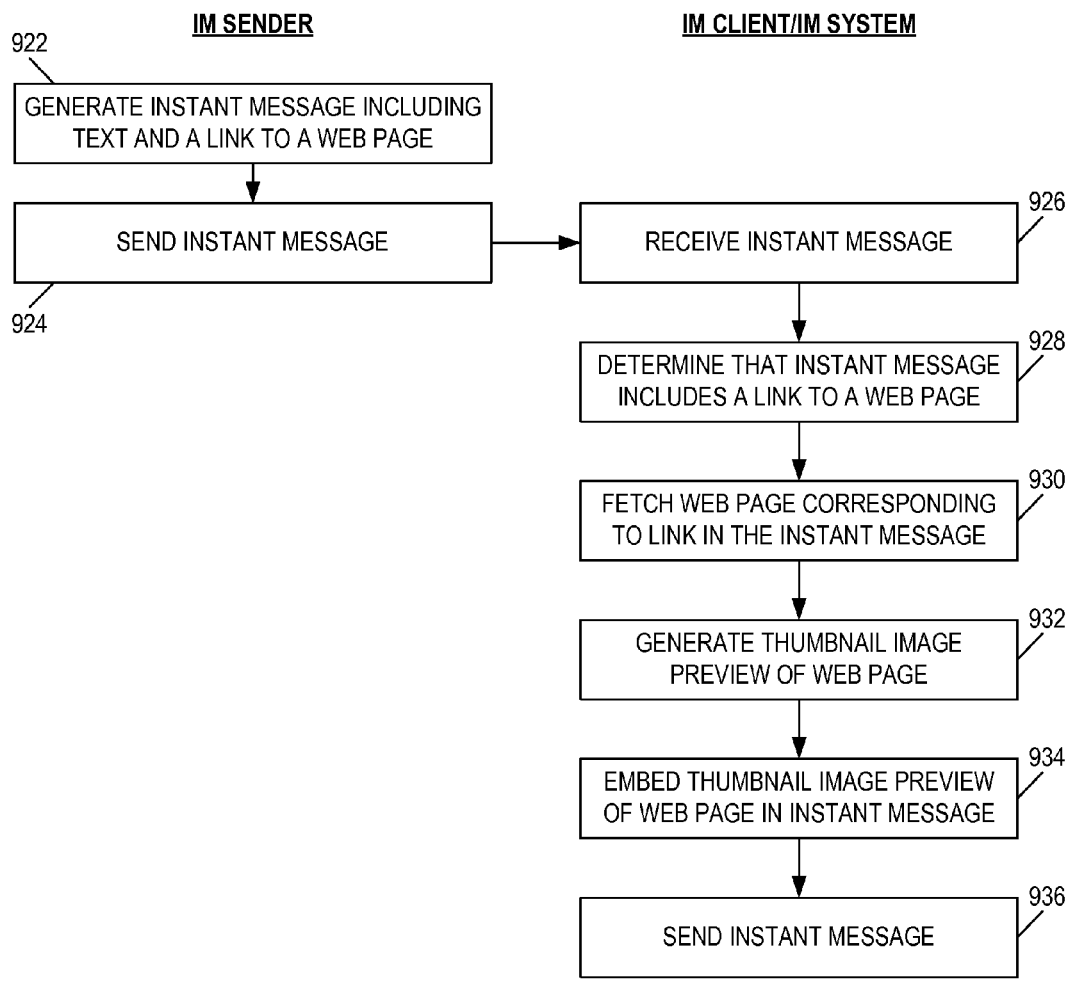
FIG. 9b is a diagram of a process for generating a thumbnail image preview of a web page that is made accessible by a link included in an instant message.

FIG. 9b is a diagram of a process 920 for generating a thumbnail image preview of a web page that is made accessible by a link included in an instant message. The process 920 may be performed by, for example, an instant message sender and one or more of an instant messaging client application running on a client computer of the instant message sender and a hosted instant messaging system.

The process 920 begins when the instant message sender generates an instant message including text and a link to a web page via an instant messaging interface on the instant message sender's client computer (922). The instant message sender then sends the instant message by, for example, selecting a send control presented to the instant message sender by the instant messaging interface (924). Before the instant message is delivered to the intended recipient, the instant message is received, or otherwise intercepted, by an instant messaging client application running on the instant message sender's client computer or a hosted instant messaging system (926). In response to determining that the instant message includes a link to a web page (928), the web page corresponding to the link in the instant message is fetched (930) and a thumbnail image preview of the web page is generated (932). Thereafter, the thumbnail image preview is embedded within, or otherwise attached to, the instant message (934), and the instant message is sent to the intended recipient (936).

The systems and techniques described above are not limited to any particular hardware or software configuration. Rather, they may be implemented using hardware, software, or a combination of both. In addition, the methods and processes described may be implemented as computer programs that are executed on programmable computers comprising at least one processor and at least one data storage system. The computer programs may be implemented in a high-level compiled or interpreted programming language, or, additionally or alternatively, the computer programs may be implemented in assembly or other lower level languages, if desired. Such computer programs typically will be stored on computer-usable storage media or devices (e.g., CD-Rom, RAM, or magnetic disk). When read into a processor of a computer and executed, the instructions of the programs may cause a programmable computer to carry out the various operations described above.

A number of implementations have been described. Nevertheless, it will be understood that various modifications may be made. For example, useful results still may be achieved if steps of the disclosed techniques are performed in a different order and/or if components in the disclosed systems are combined in a different manner and/or replaced or supplemented by other components. Accordingly, other implementations are within the scope of the following claims.

What is claimed is:
1. A method comprising:
  identifying, in a first web page, a first link to a second web page;
  identifying at least a first feature and a second feature of the second web page;
  generating an active preview of at least a portion of the second web page, wherein generating the active preview comprises generating a scaled down version of the second web page by scaling down the first feature by a first scaling factor and scaling down the second feature by a second scaling factor, the first scaling factor being smaller than the second scaling factor;
  detecting, by at least one processor, a first triggering user-interaction with the first link;
  upon detecting the first triggering user-interaction, providing the active preview of at least the portion of the second web page while at least a portion of the first web page is being displayed;

detecting, by the at least one processor, a second triggering user-interaction with a link to a third webpage provided in the active preview of at least the portion of the second web page; and upon detecting the second triggering user-interaction, opening the third webpage.

2. The method as recited in claim 1, wherein detecting the first triggering user-interaction with the first link comprises detecting a cursor is hovering over the first link.

3. The method as recited in claim 1, wherein the first link is represented on the first web page as a textual description of content of the second web page.

4. The method as recited in claim 1, wherein providing the active preview of at least the portion of the second web page while at least the portion of the first web page is being displayed comprises displaying the active preview as an overlay over the first web page.

5. The method as recited in claim 1, further comprising:
detecting a selection of the active preview of at least the portion of the second web page; and
providing the second web page in response to detecting the selection of the active preview.

6. The method as recited in claim 5, wherein:
the first web page is open in a first tab of a browser; and
providing the second web page comprises opening the second web page in a second tab of the browser.

7. The method as recited in claim 1, further comprising:
detecting an entry of a search query into a search query field in the active preview of at least the portion of the second web page; and
performing a search via the active preview of at least the portion of the second web page using the search query entered into the search query field in the active preview of the second web page.

8. The method as recited in claim 1, wherein the first feature and the second feature each comprises one or more of text, links, or images.

9. The method as recited in claim 1, wherein:
the second feature comprises an image; and
the first feature comprises text.

10. A graphical user interface produced on a computing device having a display associated therewith, the graphical user interface comprising:
a first web page displayed on the display, the first web page including a first link to a second web page, the second web page comprising at least a first feature and a second feature;
an active preview of at least a portion of the second web page displayed on the display while a cursor is hovering over the first link, the active preview of at least the portion of the second web page being displayed as an overlay over at least a portion of the first web page, the active preview comprising the first feature scaled down by a first scaling factor and the second feature scaled down by a second scaling factor, the first scaling factor being smaller than the second scaling factor; and
a third web page displayed on the display upon detecting a second triggering user-interaction with a link to the third webpage provided in the active preview of at least the portion of the second web page.

11. The graphical user interface as recited in claim 10, further comprising displaying the first link as a textual description of content of the second web page.

12. The graphical user interface as recited in claim 11, wherein the first feature and the second feature each comprises one or more of text, links, or images.

13. The graphical user interface as recited in claim 12, wherein:
the second feature comprises an image; and
the first feature comprises text.

14. A system comprising:
one or more processors;
a non-transitory storage medium comprising instructions, that when executed by the one or more processors, cause the system to:
provide a first web page having a first link to a second web page, the second web page comprising a first feature and a second feature;
generate an active preview of at least a portion of the second web page, wherein the active preview comprises a scaled down version of the second web page in which the first feature is scaled down by a first scaling factor and the second feature is scaled down by a second scaling factor, the first scaling factor being smaller than the second scaling factor;
in response to a first triggering user-interaction with the first link, provide the active preview of at least the portion of the second web page while at least a portion of the first web page is being displayed; and
in response to a second triggering user-interaction with a second link in the active preview of at least the portion of the second web page, provide a third web page.

15. The system as recited in claim 14, wherein the first triggering user-interaction is a selection of the first link.

16. The system as recited in claim 15, wherein:
the first link is represented on the first web page as a textual description of content of the second web page; and
the second link is represented in the active preview as a textual description of content of the third web page.

17. The system as recited in claim 16, further comprising instructions, that when executed by the one or more processors, cause the system to:
detect an entry of a search query into a search query field in the active preview of the second web page; and
perform a search via the active preview of the second web page using the search query entered into the search query field in the active preview of the second web page.

18. The system as recited in claim 14, wherein the instructions, when executed by the one or more processors, cause the system to:
provide the active preview of at least the portion of the second web page by providing the active preview of at least the portion of the second web page for display as an overlay over a rendering of the first web page.

19. The system as recited in claim 14, wherein the first feature and the second feature each comprises one or more of text, links, or images.

20. The system as recited in claim 14, wherein:
the second feature comprises an image; and
the first feature comprises text.

* * * * *